United States Patent [19]

Majewski

[11] Patent Number: 5,089,079
[45] Date of Patent: Feb. 18, 1992

[54] RETREAD RING

[75] Inventor: Robert H. Majewski, Findlay, Ohio

[73] Assignee: The Hercules Tire & Rubber Company, Findlay, Ohio

[21] Appl. No.: 531,781

[22] Filed: Jun. 1, 1990

[51] Int. Cl.$^5$ .............................................. B29D 30/54
[52] U.S. Cl. ............................ 156/394.1; 156/96; 156/909; 425/17; 425/58
[58] Field of Search ............ 156/394.1, 909, 398, 156/421.6, 96; 425/17, 19, 58

[56] References Cited

U.S. PATENT DOCUMENTS

| | | | |
|---|---|---|---|
| 4,579,619 | 4/1986 | Symmes et al. | 156/394.1 |
| 4,600,467 | 7/1986 | Perdue | 156/394.1 |
| 4,850,834 | 7/1989 | Hinson et al. | 156/909 X |
| 4,966,640 | 10/1990 | Hill | 156/909 X |

*Primary Examiner*—Geoffrey L. Knable
*Attorney, Agent, or Firm*—Pearne, Gordon, McCoy & Granger

[57] ABSTRACT

A retread curing ring assembly that includes a conical frustum seat insertable within an opening of a tire carcass to be cured. The retread curing ring captures the edge portions of an elastomeric envelope draped over the tire carcass and a tread strip between the conical seat and the inner edge of the circumferential bead formed along the interior edge of the sidewalls of the tire carcass. A plurality of clamping assemblies are circumferentially disposed around a circular body member to which the conical seat is attached. Each clamping assembly has a clamping arm movable between an open and closed position. When the curing ring is positioned within the tire carcass, the clamping arms are moved to their closed positions, thereby drawing the curing ring further within the tire carcass to form a seal between the inner edge of the circumferential bead and the conical seat.

24 Claims, 3 Drawing Sheets

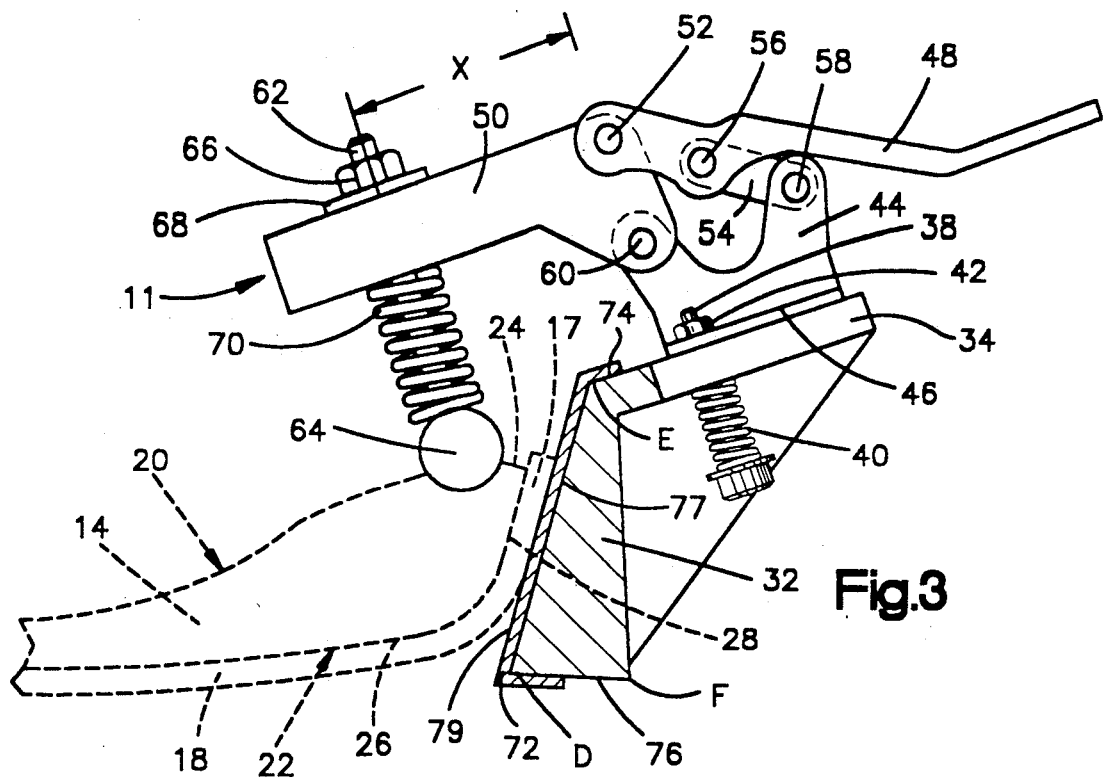
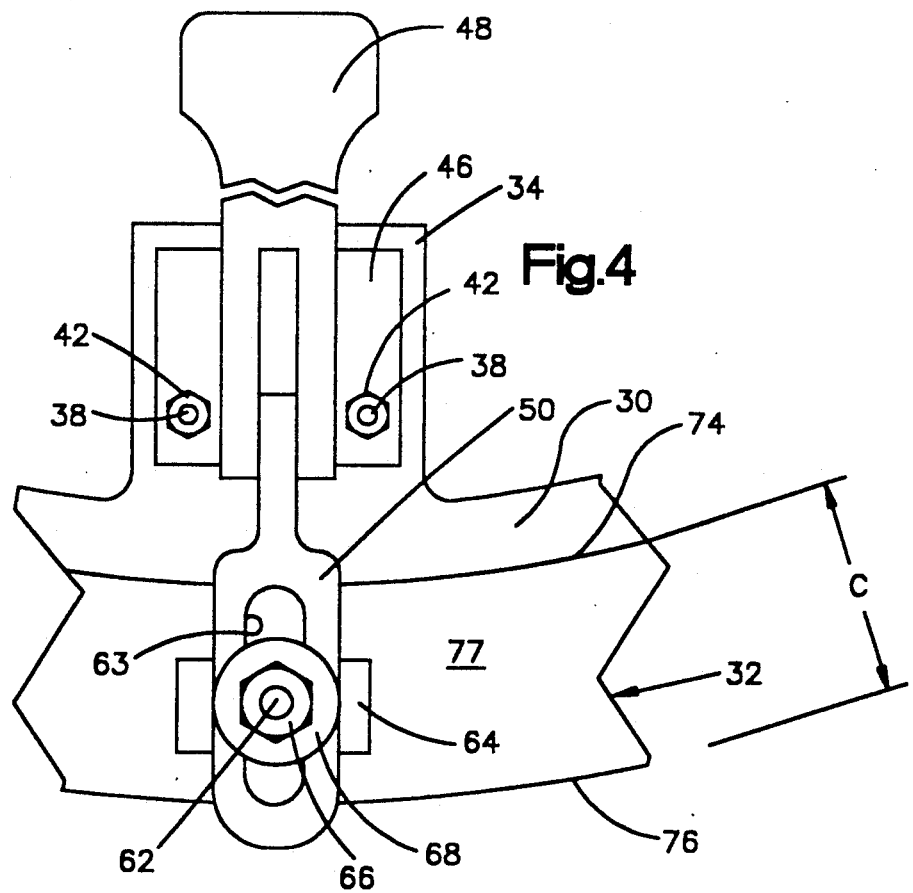

RETREAD RING

BACKGROUND OF THE INVENTION

1. Field of the Invention

This invention relates generally to apparatus for retreading tires, and in particular to a retread curing ring that is mounted on a tire retread assembly for effectuating a seal of the retread assembly during the curing process.

2. Description of the Prior Art

In general, there are two methods commonly used in the retread industry for retreading tires. The first method involves buffing the surface of a tire carcass to be retreaded and covering it with a layer of uncured rubber. This assembly is then placed in a standard tire retread mold. The rubber is shaped to the desired pattern by applying pressure inside the tire and then heating the entire assembly until the uncured rubber is cured and bonded to the tire carcass.

The second method involves retreading without the use of a standard retread mold. In this method, a pre-cured tread strip is applied to the prepared carcass together with an intermediate thin layer of uncured rubber. This assembly is then placed into a flexible elastomeric envelope which encases a portion of the carcass and the pre-cured tread strip. Normally, the tire carcass is mounted on a rim prior to placing the assembly within the flexible envelope. In addition to the rim, an inner tube is normally positioned within the tire carcass. Finally, the entire assembly is positioned within an autoclave to cure the intermediate layer, thus bonding the pre-cured tread strip to the tire carcass.

A third method recently developed in the retread industry uses a pair of retread curing rings that eliminate the tire rim and inner tube, thereby reducing the time required for curing the tire assembly. Retread curing rings of this nature can normally reduce the curing time by at least one third, thereby significantly increasing the rate of production in a tire retreading operation.

In particular, U.S. Pat. No. 4,579,619, issued to Symmes et al. on Apr. 1, 1986, discloses a retread curing ring that includes a body member that defines a circular platform. A plurality of clamps, which are movable between an open and closed position, are mounted at circumferentially spaced locations on the body member. The retread curing ring is designed for use with a tire retread assembly that includes a tire carcass, a tread strip, and a flexible elastomeric envelope that fits over the tire carcass and tread strip. The tire carcass includes a retread area upon which the tread strip is placed and a pair of integral side walls that extend radially inwardly until they end forming a circumferential bead. The circumferential bead is generally considered to include two portions: an exterior edge and an inner edge. The exterior edge is that portion of the bead which faces outside the tire carcass and the inner edge is that portion of the bead between the exterior edge and the interior of the sidewall. Each tire carcass has two openings so that the carcass can be mounted upon a rim. The inner edge of the bead essentially defines the circumference of one opening within the tire carcass. Also, a bead angle is formed by the inner edge between the exterior edge of the bead and the interior of the sidewall. Many tires that are subject to retreading have a bead angle of between about 14° and 15°.

The retread curing ring of Symmes et al. is designed so that an upper surface of the circular body member fits adjacent the sidewall of the bead. The clamps mounted on the circular body member define a vertical guide surface against which the inner edge of the bead rests when the ring is placed within an opening of the tire carcass. The function of the vertical guide surface is to assure that the tire carcass is concentrically aligned with the retread curing ring during operation. When the tire carcass and envelope are in position, the end portions of the envelope are sandwiched between the sidewall near the exterior edge of the bead and the upper surface of the circular body member. With the tire assembly mounted upon the retread curing ring in this manner, the clamps are moved to their closed position and pressure is exerted against the interior of the sidewalls so that the envelope is sealed against the exterior of the sidewall near the exterior edge of the bead.

It has been discovered that the retread curing ring of Symmes et al. does not always provide sufficient pressure to seal the envelope of the tire assembly against the exterior edge of the bead and sidewall. Thus, gas leakage occurs during the curing process. A failure rate of approximately 10 to 50 per cent has been experienced by some segments of the retread industry using the Symmes ring.

An improvement was made to the Symmes ring in an effort to remedy this problem in U.S. Pat. No. 4,850,834, issued to Hinson et al on July 25, 1989. The Hinson patent discloses a retread curing ring similar to the ring of Symmes et al., but which also includes a circular elastomeric gasket against which the exterior edge of the bead and sidewall engage. In a manner similar to Symmes et al., the clamping arms engage the interior edge of the bead and sidewall at an angle of approximately 90°. Again, the seal is primarily effectuated along the outer wall and exterior edge of the bead. The curing ring of Hinson also provides a guide surface against which the inner edge of the bead and envelope rest for proper alignment of the tire assembly with the ring during operation. The Hinson ring also had a relatively high percentage of retread tires which would not seal with it satisfactorily.

SUMMARY OF THE INVENTION

Accordingly, a preferred embodiment of the present invention provides a retread curing ring having increased sealing capabilities over those rings discussed above. These capabilities have resulted in a higher curing success rate. Moreover, in testing conducted to date, no known leaks have been detected during the curing process when using a preferred embodiment of the present invention.

A preferred embodiment of the present invention is used with a tire carcass, a tread strip, and an elastomeric envelope. The sealing engagement between the tire carcass and elastomeric envelope is obtained by providing a conical frustum seat that is insertable within one opening of the tire carcass. At least two clamps are mounted upon the conical seat for engaging the interior of the sidewall and urging the bead toward the conical seat.

When the conical seat is inserted within an opening of the tire carcass, one edge portion of the elastomeric envelope is captured between the inner edge of the circumferential bead and the conical seat. Pressure is exerted between the inner edge of the bead and the conical seat at every point along the conical seat's circumference. When the clamps are moved to their closed position, the conical seat is drawn further toward the inside of the tire carcass and a tighter seal is obtained.

The shape of the conical seat is employed advantageously because a seal is created as soon as the conical seat is placed within one opening of the tire carcass In an alternate embodiment, it has been discovered that superior sealing is attained when the surface of the conical seat is substantially parallel with the bead angle formed by the inner edge of the bead. As the conical seat is pushed further within the opening a larger diameter portion of the ring engages the bead, thereby increasing the tightness of the seal between the elastomeric envelope and the inner edge of the bead. Closing the clamps draws the conical seat further inwardly, thereby realizing a maximum sealing potential.

Another alternate embodiment of the present invention utilizes a smooth rubber gasket that covers the conical seat. The gasket produces an improved sealing effect Moreover, a preferred embodiment of the conical seat is made of aluminum which expands when heated. When a ring having an aluminum seat is mounted upon a tire retread assembly and placed within an autoclave, the aluminum expands radially outwardly, resulting in even better sealing.

The retread industry demands that retreading be done on tires having various bead diameters that are measured from the inner edge of the bead. The present invention can accommodate varying bead diameters due to the shape of the conical seat and adjustments on the clamps Furthermore, the present invention can be used with tubeless or tube-type tires.

It has been discovered that the present invention extends the useful life of the elastomeric envelope because the envelope does not stretch as much as when used with the prior art rings.

The preferred embodiment of the present invention is advantageous over the prior art rings discussed above because they rely substantially upon the pressure created by the clamps to achieve the seal between the envelope and the exterior edge of the circumferential bead. The areas between those clamps are subject to leakage because the seal is not tight enough. The preferred embodiment of the present invention overcomes this disadvantage by providing a conical seat that creates a tight seal at every point along its circumference.

BRIEF DESCRIPTION OF THE DRAWINGS

FIG. 3 is a side elevational view of a clamping assembly of FIG. 1 with a tire carcass and envelope shown in dashed lines; and FIG. 4 is a top plan view of the clamping assembly of FIG. 3.

DETAILED DESCRIPTION OF THE PREFERRED EMBODIMENT

Figure 1:
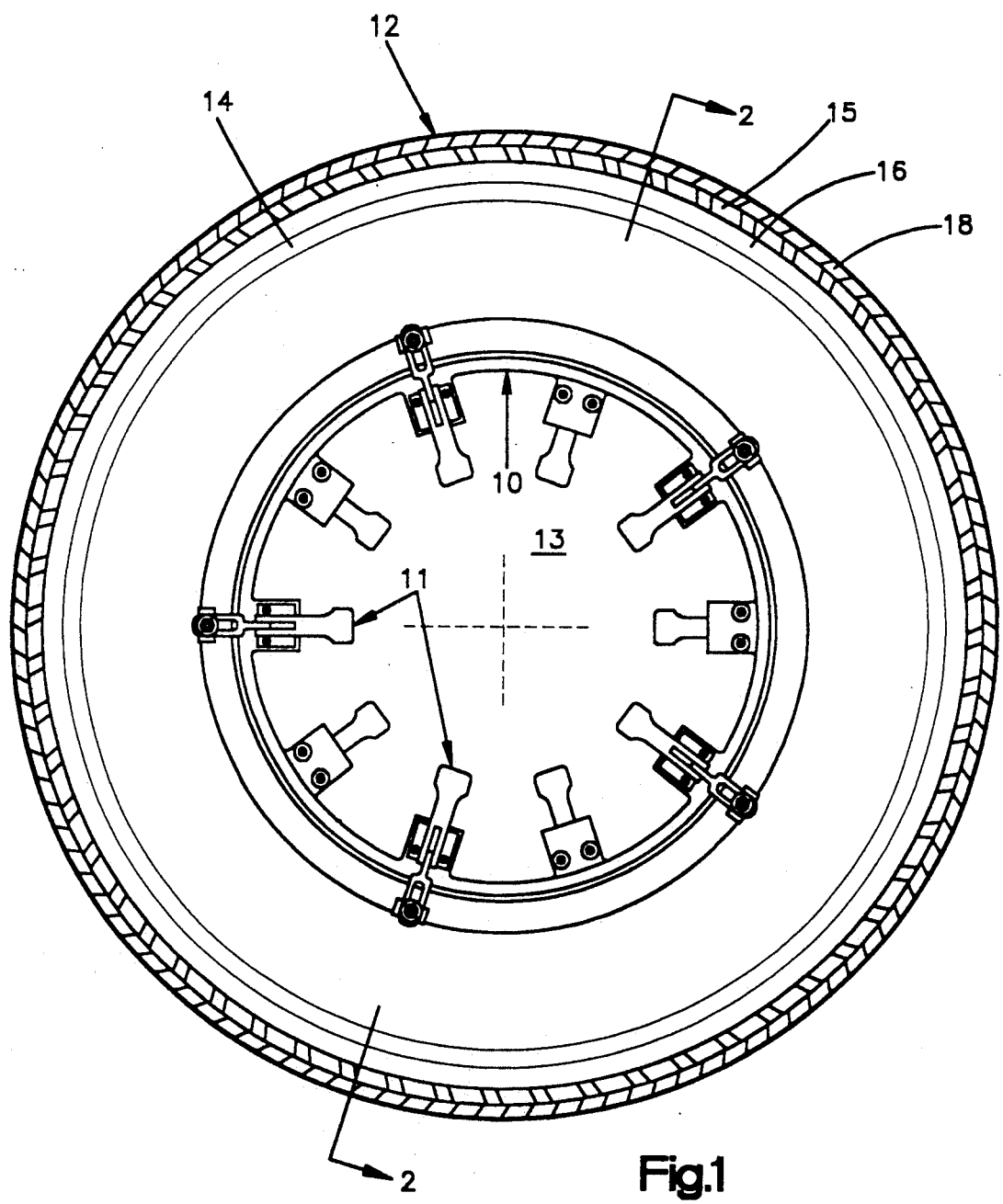
FIG. 1 is a fragmentary plan view of a tire retread assembly having a retread curing ring according to a preferred embodiment of the present invention positioned on each side of the tire retread assembly, shown in FIG. 2.
Figure 2:
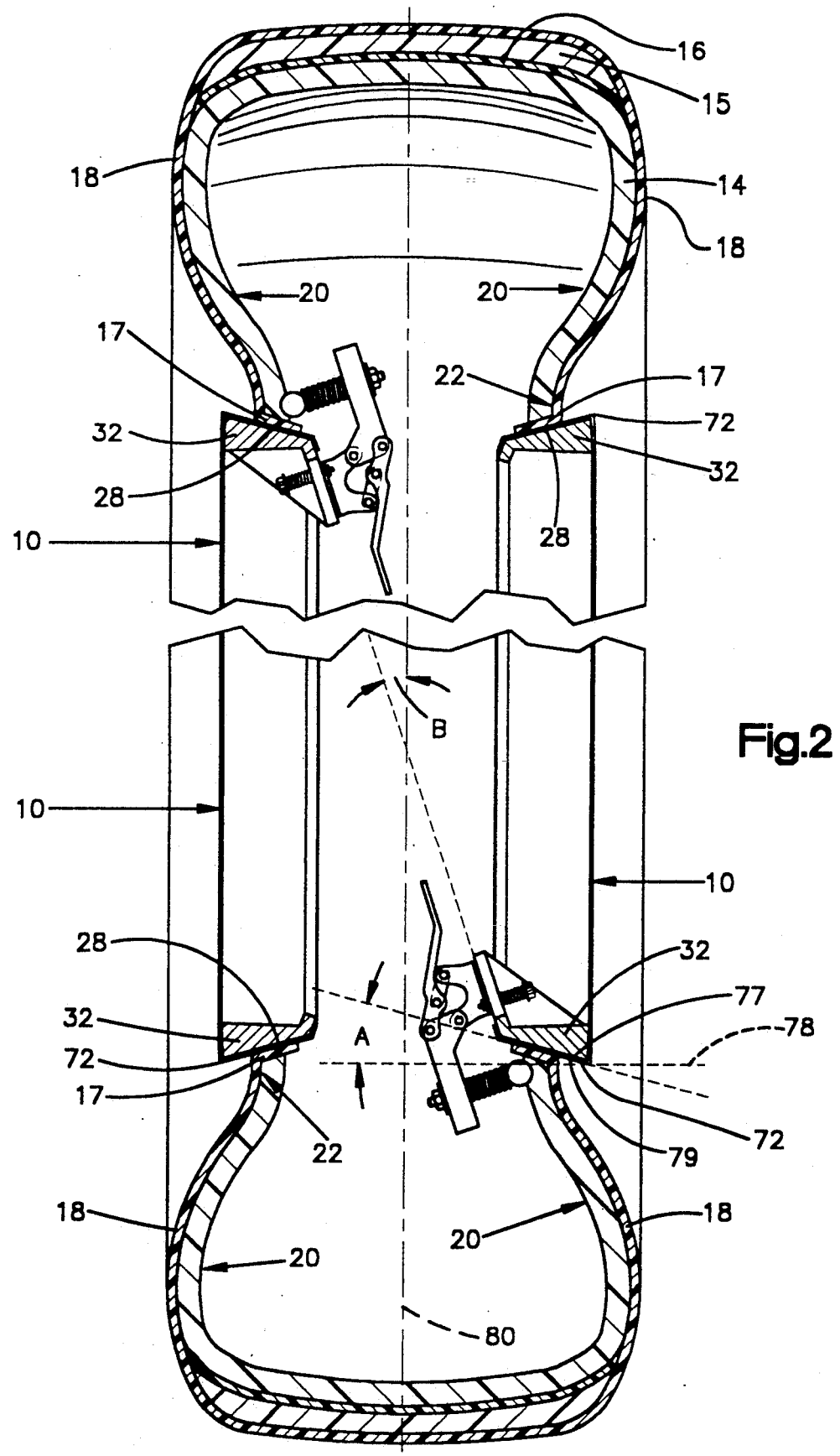
FIG. 2 is a fragmentary, cross-sectional view, taken along the line 2—2 of FIG. 1.

Referring now to the drawings' and in particular to FIG. 1, there is shown a preferred embodiment of the present invention generally referred to by reference numeral 10. FIG. 1 illustrates a preferred retread curing ring 10 mounted on each side of a tire carcass 14 with part of the carcass broken away to show several clamping assemblies 11 in their closed position. The retread curing rings 10 are mounted upon a retread assembly 12 that includes the tire carcass 14, an intermediate gum layer 16, a tread strip 15, and an elastomeric envelope 18. The elastomeric envelope 18 is draped over the tire carcass 14 and tread strip 15 with its edge portions 17 extending radially inwardly on each side of the tire carcass 14. With the elastomeric envelope 18 in this position a retread curing ring 10 can be inserted into an opening 13 of the tire carcass 14 so that the edge portions 17 are captured between the curing ring 10 and the tire carcass 14 as shown in FIG. 2.

Referring again to FIG. 2, the tire carcass 14 includes integral sidewalls 20 that extend radially inwardly until each one forms a circumferential bead 22. Each circumferential bead 22 includes an exterior edge 26 and inner edge 28, as best illustrated in FIG. 3. The inner edge 28 terminates where it intersects with the interior edge 24 of the sidewall 20. When a retread curing ring 10 is inserted within one opening 13 of the tire carcass 14, the edge portions 17 of the elastomeric envelope 18 are captured between the inner edge 28 of the circumferential bead 22 and the retread curing ring 10.

Referring to FIG. 4, each retread curing ring 10 includes a circular body member 30 joined to a conical frustum seat 32. The body member 30 and conical seat 32 are preferably made of aluminum, but could alternatively be made of any suitable material known in the industry. The circular body member 30 includes a plurality of mounting bases 34 each of which has a clamping assembly 11 mounted thereto. In an alternative embodiment, the circular body member could be eliminated and the clamping assemblies 11 could be mounted on a plurality of lugs, or other suitable mounting means that are joined to the conical seat 32.

Preferably, the clamping assemblies are of the type commercially available and manufactured by De-Sta-Co. A clamping assembly 11, having Model No. 215U, is used with tire carcasses 14 having bead diameters of about 16 inches. The bead diameter is measured from the inner edge 28 of the bead 22. Tire carcasses 14 having bead diameters of about 20 inches, 22.5 inches, or 24.5 inches use clamping assemblies 36 having Model No. 225U. Alternatively, any suitable clamping means could be used to secure the curing ring 10 within an opening 13.

Each clamping assembly 11 is mounted by means of two or more threaded bolts 38 having a spring 40 placed thereover and being secured to the mounting base 34 by a nut 42. The spring 40 over each bolt 38 allows for adjusting the tension and position of the clamping assemblies 11 against the circumferential bead 22, as best shown in FIG. 3. Each spring 40 is preferably of stainless steel with an outside diameter of 0.686 inch, left-hand wound, squared and ground to a length of 1.406 inches, e.g., about six coils. Preferably, there are four or five (five being shown) clamping assemblies symmetrically disposed upon the circular body member 30, but, alternatively, any suitable number could be used.

Referring again to FIG. 3, each clamping assembly includes a base support 44 and a base member 46 that are used to anchor the clamping assembly 11 to the mounting base 34. A bifurcated handle 48 is pivotally connected at one end to a lever arm 50 by means of a pivot pin 52. The bifurcated handle 48 is also connected to a link 54 by means of a pivot pin 56. The other end of the link 54 is connected to the base support 44 by a pivot pin 58. The lever arm 50 is also connected to the base support 44 by a pivot pin 60. The lever arm 50 includes a slot 63 that is adapted to receive a threaded clamp rod 62 that has a clamping arm 64 connected at one end. The clamp rod 62 is inserted into the slot 63 and secured to the lower arm 50 by an adjusting nut 66 and a washer 68. Alternatively, the clamp rod 62 could be connected to the lever arm 50 with no adjustment capabilities. A spring 70 is placed over the clamp rod 62 when connected to the lever arm 50. The spring 70 is employed for positioning the clamping arm 64 against the interior edge 24 of the sidewall 22. Preferably, the spring 70 is substantially the same as spring 40, except that spring 70 is squared and ground to a length of 0.968 inch and has about 4.5 coils.

With particular reference to FIG. 3, the conical frustum seat 32 preferably has a gasket 72 covering its surface 77. Alternatively, the retread curing ring 10 could be used without the gasket 72, or the gasket 72 could cover only a portion of the surface 77. The gasket 72 is joined over the conical frustum seat 32 in any suitable manner, such as a form fit. Bonding means, such as an appropriate adhesive, could also be used to secure the gasket 72 to the seat 32. The gasket 72 preferably overlaps onto an upper surface 74 and a lower surface 76 to help secure the gasket 72 to the retread curing ring 10. Referring to FIG. 4, the distance C between the upper surface 74 and lower surface 76 is preferably about 2 inches when curing a tire having a bead diameter of 20 inches, but could alternatively be any suitable distance. The gasket 72 is preferably made from a smooth rubber compound such as a rubber EPDM, thermoplastic or thermoset resin, but could alternatively be made of any suitable material known in the industry.

Referring now to FIG. 2, when a retread curing ring 10 is inserted within an opening 13 of a tire carcass 14, the edge portions 17 of the elastomeric envelope 18 are tightly captured between the inner edge 28 of the circumferential bead 22 and the gasket 72. Preferably, the edge portions 17 extend beyond the inner edge 28 into the interior of the tire carcass 14. Alternatively, the edge portions 17 could stop at any suitable point along the inner edge 28 provided that a proper seal is effectuated.

The surface 77 of the conical frustum seat 32 and the surface 79 of the gasket 72 each form an angle A with respect to the horizontal plane line 78 of the tire assembly 12. Preferably, angle A is about 14° when the curing ring 10 is used with tubeless tires. The angle A is preferably about 7° when the curing ring 10 is used with tube-type tires having a bead diameter of between about 10 inches to 20 inches. Alternatively, the angle A could be changed so that the conical frustum seat 32 can accommodate varying circumferential bead angles and bead diameters. Preferably, the surface 77 of the conical seat 32 is substantially parallel with the inner edge 28 of the circumferential bead 22 when the ring 10 is inserted within a tire carcass 14.

Referring again to FIG. 3, the lever arm 50 is substantially parallel to the upper surface 74 of the conical seat 32 when the clamping assembly 11 is in its closed position, and the clamping rod 62 is substantially perpendicular to the lever arm 50. Alternatively, the lever arm 50 and the clamping rod 62 could be positioned in any suitable manner. Preferably, the distance X between the longitudinal axis of the pivot pin 52 and the longitudinal axis of the clamping rod 62 is such that when each clamping assembly 11 is in its closed position, the longitudinal axis of each clamping rod 62 would intersect the conical seat 32 if extended through the bead 22. The clamping rod 62 is slidable within slot 63 so it can be adjusted to accommodate variations in the bead angles or diameters.

The upper surface 74 defines an angle B with respect to the central plane line of the tire retread assembly 12, as shown in FIG. 2. Preferably, angle B is about 7° when the curing ring 10 is used with a tire carcass having a bead diameter of about 20 inches. Alternatively, the angle B may be adjusted to accommodate varying bead angles and bead diameters.

Referring again to FIG. 3, the conical seat 32 includes diameters at points D, E, and F, which may vary depending upon the bead diameter of the carcass 14 being cured. For example, it is preferred that when the curing ring 10 is used with a carcass 14 having a bead diameter of about 20 inches, the diameter of the conical seat 32 at point D is about 20.116 inches, at point E is about 19.625 inches, and at point F is about 18.675 inches. These diameters may vary accordingly, depending upon the size of the tire assembly 12 to be cured.

Although the preferred embodiments of this invention have been shown and described, it should be understood that various modifications and rearrangements of the parts may be resorted to without departing from the scope of the invention as disclosed and claimed herein.

What is claimed is:

1. A retread curing ring for mounting on a tire retread assembly, the tire retread assembly including a tire carcass defining a retread area and having integral sidewalls that form a circumferential bead along each sidewall's inner edge, each circumferential bead including an exterior edge, and an inner edge that defines a bead angle, a preformed tread strip positioned on the retread area, and a flexible envelope surrounding the tread strip and the sidewalls and extending on each side of the tire carcass over the inner edge of the bead so that a portion of each edge of the envelope is captured between the inner edge of one circumferential bead and said retread curing ring, said retread curing ring comprising:
    means for holding clamping means;
    a conical seat capable of being insertable within one opening of the tire carcass the conical seat having a complementary shape and angle relative to the circumferential bead so that one edge portion of the flexible envelope is captured and sealed exclusively between the inner edge of one circumferential bead and a surface of said conical seat, said means for holding said clamping means being joined to said conical seat;
    clamping means comprising a clamping arm movable between an open and a closed position, said clamping arm when in the closed position capable of engaging the interior of one sidewall and urging the circumferential bead toward said conical seat so that the edge portion of the flexible envelope is tightly exclusively captured between the inner edge of the circumferential bead and the surface of said conical seat.

2. A retread curing ring as recited in claim 1, wherein the surface of said conical seat is substantially parallel to the bead angle when said retread curing ring is inserted within said tire carcass.

3. A retread curing ring as recited in claim 2, wherein the surface of said conical seat is at an angle of about 15 degrees with respect to the horizontal plane line of the ring when the ring is in a vertical position.

4. A retread curing ring as recited in claim 1, wherein said clamping means includes a plurality of clamping means and the means for holding includes a plurality of means for holding the clamping means.

5. A retread curing ring as recited in claim 4, wherein each of said clamping means further comprises a biasing means operatively attached to said clamping arm for urging said clamping arm toward said conical seat and means for adjusting the radial position of said clamping arm.

6. A retread curing ring as recited in claim 4, wherein each of said clamping means further comprises a movable lever arm connected at one end to a bifurcated handle by a pivot pin, said biasing means comprising a rod mounted for movement on said lever arm and a spring surrounding said rod, said clamping arm being mounted on one end of said rod.

7. A retread curing ring as recited in claim 4, wherein four of said clamping means are symmetrically disposed upon said holding means.

8. A retread curing ring as recited in claim 1, further comprising a gasket covering at least a portion of the surface of said conical seat.

9. A retread curing ring as recited in claim 8, wherein said gasket is made of rubber.

10. A retread curing ring as recited in claim 6, wherein each of said rods is capable of engaging the interior edge of one sidewall at an angle of about 90 degrees.

11. A retread curing ring as recited in claim 6, wherein when said clamping arm is in the closed position the longitudinal axis of said clamping rod will intersect the surface of said conical seat if extended through the circumferential bead.

12. A retread curing ring as recited in claim 1, wherein said means for holding said clamping means includes circular body member joined to said conical seat.

13. A retread curing ring as recited in claim 1, wherein said means for holding said clamping means forms an angle of about 7 degrees with respect to a central plane line of the tire retread assembly when the curing ring is mounted on a tire.

14. A retread curing ring as recited in claim 1, wherein said conical seat is made of aluminum.

15. A ring assembly, comprising:
means for holding a plurality of circumferentially spaced clamping means;
a conical seat joined to said holding means, said conical seat being insertable within an opening of a tire carcass so that one edge portion of a flexible envelope surrounding the tire carcass is captured between a circumferential bead of the tire carcass and said conical seat the conical seat having a complementary shape and angle relative to the circumferential bead;
clamping means comprising a clamping portion moveable between an open and a closed position, said clamping portion when in the closed position capable of engaging the interior of a sidewall of the tire carcass and urging an inner edge of the circumferential bead toward said conical seat so that the edge portion of the flexible envelope is tightly captured and sealed exclusively between the circumferential bead and a surface of said conical seat.

16. A ring assembly as recited in claim 15, wherein when said ring assembly is inserted within the tire carcass the surface of said conical seat is substantially parallel to a bead angle formed by the circumferential bead.

17. A ring assembly as recited in claim 16, wherein the surface of said conical seat is at an angle of about 14 degrees with respect to the horizontal plane line of the ring when the ring is in a vertical position.

18. A ring assembly as recited in claim 15, wherein each of said clamping portions is capable of engaging the interior edge of one sidewall at an angle of about 90 degrees.

19. A ring assembly as recited in claim 15, further comprising a gasket covering at least a portion of said conical seat.

20. A ring assembly as recited in claim 19, wherein said gasket is made of rubber.

21. A ring assembly as recited in claim 19, wherein said gasket is shaped as a conical frustum and is form-fit over the surface of said conical seat.

22. A ring assembly as recited in claim 15, wherein said holding means includes a circular body member joined to said conical seat.

23. A ring assembly as recited in claim 15, wherein said conical seat is made of aluminum.

24. A ring assembly as recited in claim 15, wherein said clamping portion includes a clamping rod; and
the longitudinal axis of said clamping rod, when said clamping portion is in the closed position, intersects the surface of said conical seat if extended through the circumferential bead.

* * * * *